G. A. OLIN.
CHUCK.
APPLICATION FILED NOV. 18, 1919.
1,389,974.
Patented Sept. 6, 1921.
2 SHEETS—SHEET 2.
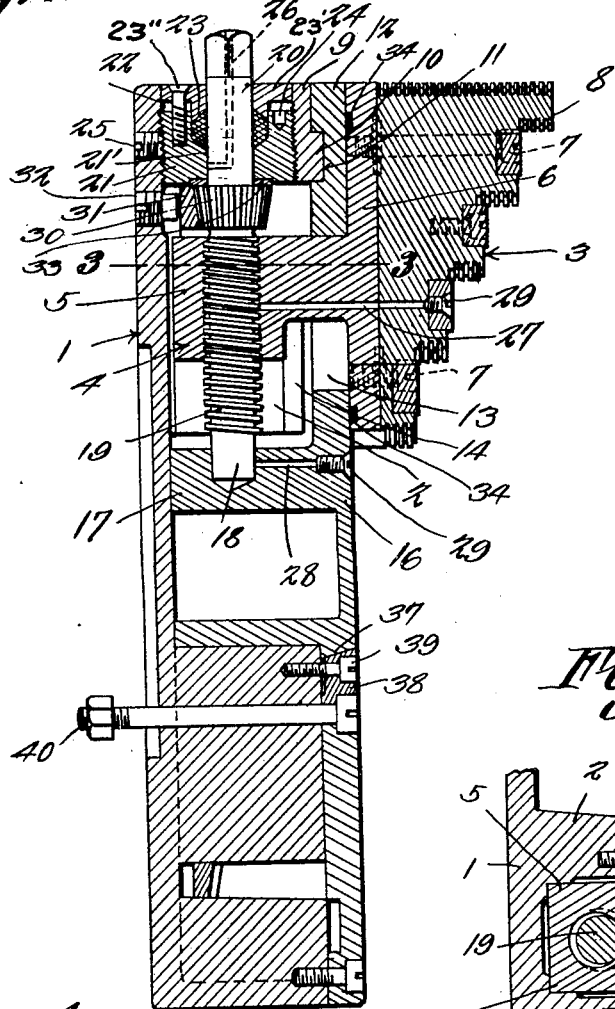
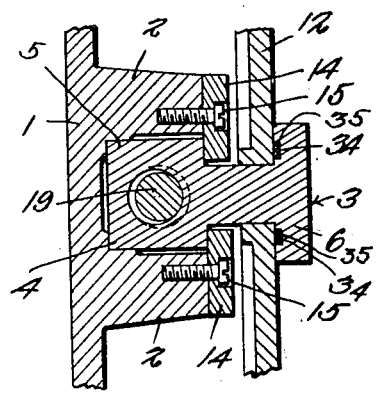
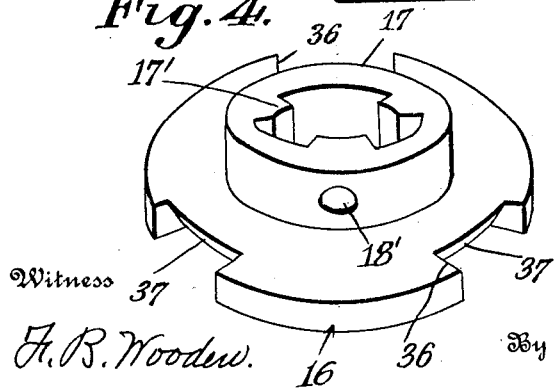
Witness
H. R. Wooden.
Inventor,
G. A. Olin
By C. A. Snow & Co.
Attorneys.

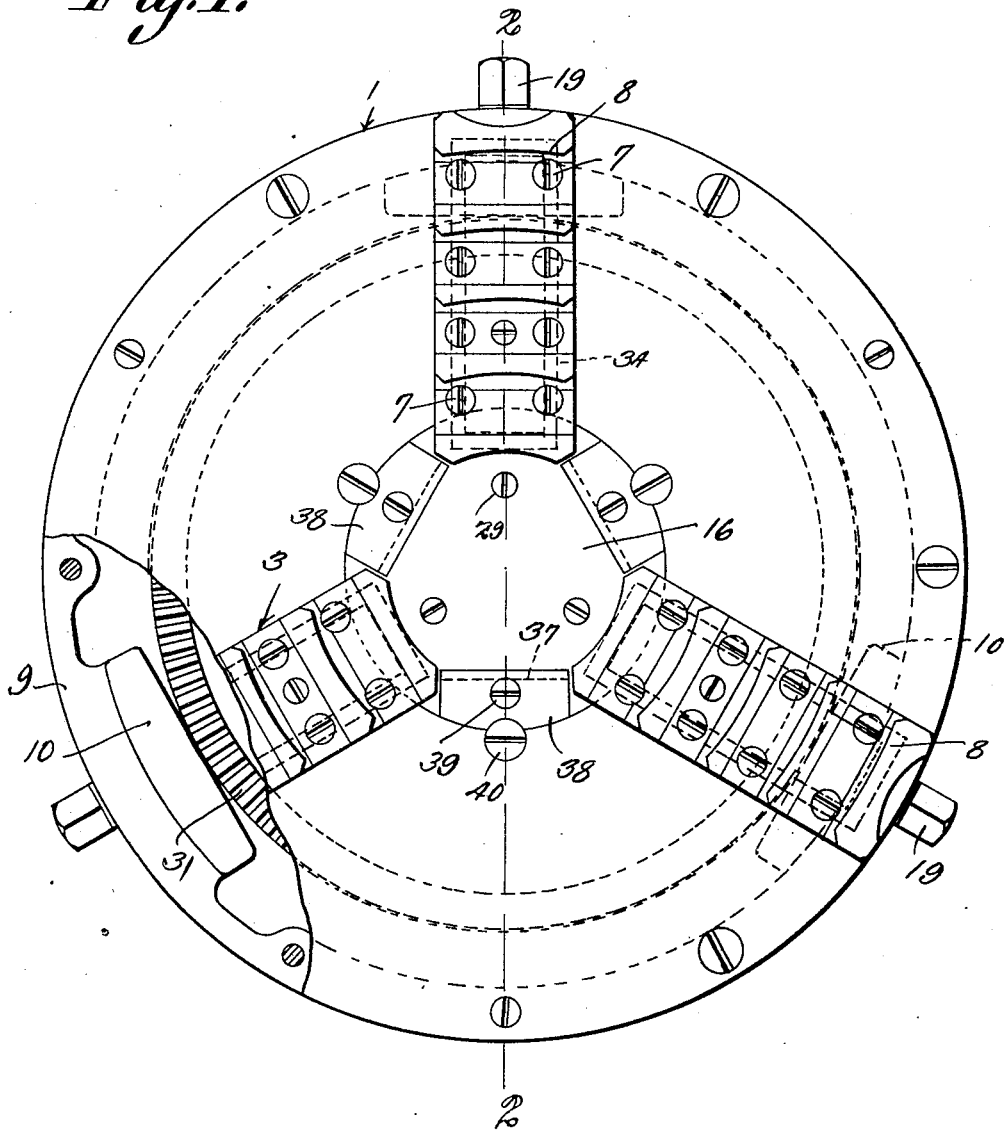

UNITED STATES PATENT OFFICE.

GUSTAF ADOLPHUS OLIN, OF WORCESTER, MASSACHUSETTS.

CHUCK.

1,389,974.　　　Specification of Letters Patent.　　Patented Sept. 6, 1921.

Application filed November 18, 1919. Serial No. 338,839.

*To all whom it may concern:*

Be it known that I, GUSTAF A. OLIN, a citizen of the United States, residing at Worcester, in the county of Worcester and State of Massachusetts, have invented a new and useful Chuck, of which the following is a specification.

This invention relates to chucks for use on lathes and other machine tools, and has for its object the provision of a chuck adapted for holding emery or other abrasive grinding wheels during the turning or truing up operation of the same, and although it may be used for all engine lathe work, is particularly adapted for holding delicate abrasive wheels, such for instance as cup, disk, or cylindrical shaped wheels of thin material.

A further object is the provision of a chuck in which the bearings are rendered absolutely dust proof; and which may be conveniently supplied with lubricant for the moving parts and which has provision for taking up any looseness caused by wear.

With these and other objects, which will appear as the description proceeds the invention resides in the novel form and arrangement of parts to be more fully described and particularly claimed, it being understood that slight changes may be made within the scope of what is claimed without departing from the spirit or sacrificing any of the advantages of the invention.

In the drawing:—

Figure 1 is a view in elevation of a chuck constructed in accordance with the present invention.

Fig. 2 is a section on line 2—2 of Fig. 1.

Fig. 3 is a sectional view on line 3—3 of Fig. 2.

Fig. 4 is a perspective view of the center plate.

Referring to the drawing by characters of reference, there is shown at 1 the body portion of the chuck being provided with pairs of parallel radial ribs 2, which provide support and guide ways for the chuck jaws 3. The jaws 3 comprise a base member 4, having a square portion 5, adapted to move between the ribs 2 and a T-shaped portion 6 formed integral with the portion 5. To the head of the T 6 is secured by means of bolts 7, the stepped holding jaws 8.

The body 1 is formed with a peripheral flange 9, the said flange being provided at a point above the ribs 2, with a lug 10 which seats in a groove 11 in the rear of a face plate 12. The face plate 12 being provided with radial slots 13, in which the leg of the T portion 6 moves as the chuck jaws are opened and closed.

Gibs 14 engage the forward face of the portion 4 and are secured by means of bolts 15 to the forward face of the ribs 2.

A center plate 16 secured to the body 1 has a rearwardly extending flange 17, said flange having thickened portions 17′. A socket 18′ is formed in each of the portions 17′ in which is journaled the end 18 of feed screws 19, the screws being threaded through the portion 5 of the jaws 3. A journal 20 is formed at the outer end of each of the feed screws and has a bearing in a block 21, the block being screw threaded in an opening 22 formed in the flange 9 of the body 1 and provided with a packing gland 23. A packing gland cap 23′ is secured to the block 21 by means of screws 23″. The block 21 has sockets 24 for the reception of a wrench when it is necessary to adjust the bearing to take up for end thrust wear. A set screw 25 threaded in the body 1 engages the block 21 to hold the same in adjusted position. An opening 26 is formed from the outer end of the feed screw to open in a bearing 21′ for supplying oil to the said bearing. Openings 27 and 28 formed in the jaw and center plate respectively are useful in supplying oil to the screw and inner bearing. Screws 29 plug these oil holes and prevent entrance of dust.

Each of the feed screws 19 is provided with a small gear wheel 30 either secured thereto or formed integral therewith, the said gear being adapted to be engaged by a ring gear rack 31, the same being held in mesh with the gear wheels by means of set screws 32 threaded in the rear wall of the body 1 and having a stem bearing against the rear face of the ring gear. The rack is used to produce simultaneous movement in all of the feed screws, as is common practice in machine chucks, and the rack may be freed from the gears 30 by backing the set screws 32, when it is desired to operate the feed screws independently. A hardened steel wear washer 33 is placed between the gear 30 and the block 21.

The rear face of the head portion 6 of each chuck jaw is provided with a groove 34 which extends completely around the said head and is provided with packing 35 which engages the forward faces of the plate 12 and the center plate 16.

By reason of the packing 35 and the glands 23 all dust and dirt are excluded from the movable parts of the chuck and this together with the perfectly lubricated bearings provide for such free and easy movement of the jaws as to enable an operator to adjust the chuck to fragile work with minute precision and delicacy.

The center plate 16 is notched as at 36, the forward face 37 being beveled, a plate 38 is fitted to the notch and is forced against the face 37 by a screw 39. A bolt 40 may be used to secure the chuck to the face plate of a lathe or other tool.

Having thus described the invention what is claimed is:—

1. In a chuck, a body, a face plate secured to the body, the body having a groove alined with a radial slot formed in the face plate; a chuck jaw slidably mounted in the groove; said jaw having a T-shaped head, one face of the head being in engagement with the face plate and entirely covering the radial slot, the said face of the T head being provided with a groove completely surrounding the radial slot, and packing carried by said groove whereby foreign matter is excluded from the radial slot.

2. In a chuck, a body, a chuck jaw slidably mounted in the body, a screw threadedly mounted in the jaw for moving the jaw in the body, a center plate in which one end of the screw is mounted for rotation, the center plate having a notch and a plate seated in said notch and secured to the body, whereby the center plate is secured to the body.

In testimony that I claim the foregoing as my own, I have hereto affixed my signature in the presence of two witnesses.

GUSTAF ADOLPHUS OLIN.

Witnesses:
HAZEL M. FAWCETT,
LUCILE M. HARMON.